United States Patent Office 3,535,831
Patented Oct. 27, 1970

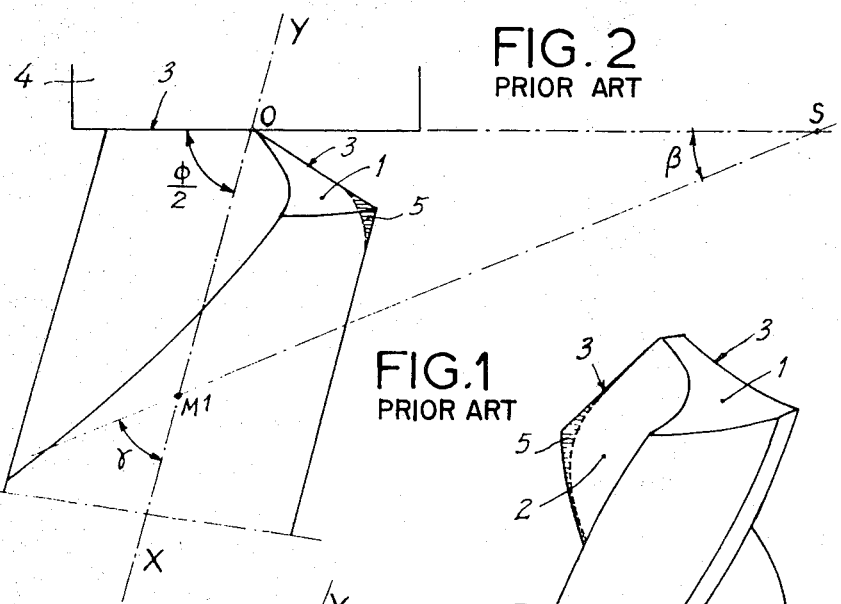
FIG. 2 PRIOR ART
FIG. 1 PRIOR ART
FIG. 3 PRIOR ART
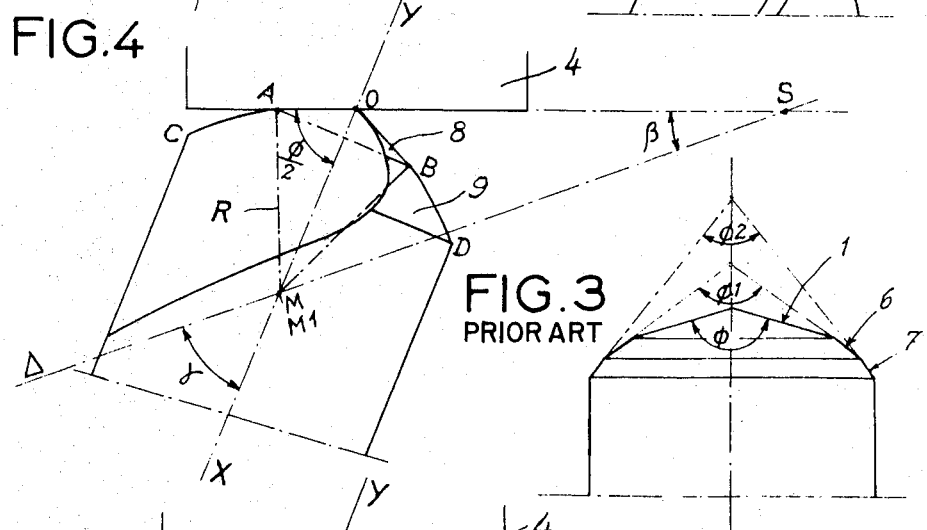
FIG. 4
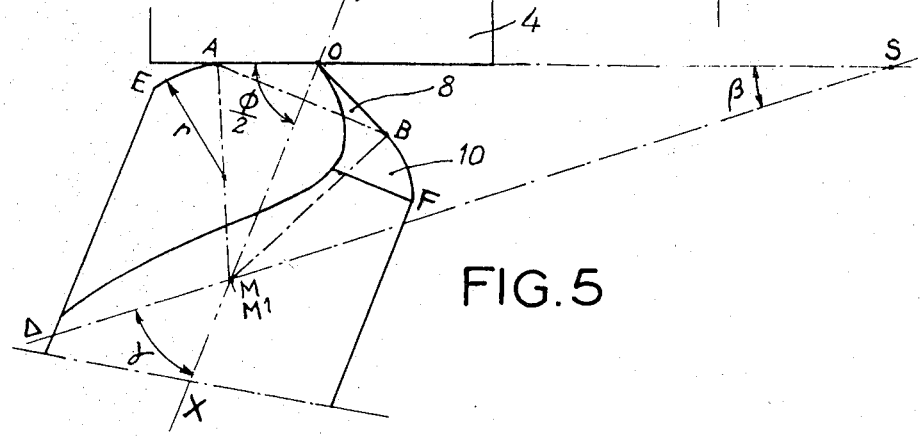
FIG. 5

3,535,831
METHOD OF SHARPENING TWIST DRILLS
François Lhomme and Bernard Leguy, Billancourt, France, assignors to Regie Nationale des Usines Renault, Billancourt, France
Filed June 15, 1967, Ser. No. 646,254
Claims priority, application France, July 19, 1966, 69,898
Int. Cl. B24b 1/00
U.S. Cl. 51—288                                    3 Claims

ABSTRACT OF THE DISCLOSURE

Method of sharpening twist drills, consisting in forming each one of the symmetrical surface portions of the drill point as a conical central surface edged with a part-spherical or toroidal surface portion tangent to said conical central surface, by sharpening said conical portion against the plane of the grinding wheel as in the case of a conventional drill by rotating the drill about an axis other than its longitudinal axis, and by sharpening said part-spherical or toroidal surface portion by adding to the preceding movement of rotation a first relative rotation between said grinding wheel and said drill about the axis of revolution corresponding to said part-spherical or toroidal surface portion, as well as a second simultaneous rotation of the drill about its longitudinal axis in the first case of a part-spherical surface portion.

The present invention relates to twist drills and has particular reference to a new method of sharpening twist drills.

Drilling is a very frequent operation in industry and therefore it is advantageous to make it as economical as possible. This invention provides a twist drill sharpening method whereby twist drills can be operated at higher speeds, thus reducing drilling time, this method also imparting a greater resistance to drill wear, thereby making re-sharpening operations less frequent and permitting drilling a greater number of holes with the same drill, so as to reduce the hold-up time of the drilling machine or other machine on which twist drills are used. Moreover, the holes are more accurate size and better finished.

Essentially, the present invention relates to a method of sharpening twist drills which consists in forming each one of the symmetrical portions of the drill point as a conical central surface edged with a part-spherical or toroidal surface tangent to said conical central surface, this conical and part-spherical surface being obtained by sharpening said conical surface against the grinding plane in the conventional manner by rotating the drill about an axis other than its geometrical axis and grinding said part-spherical or toroidal surface portion by adding to said movement of rotation a first relative rotation between the grinding wheel and the twist drill about the axis of revolution corresponding to said part-spherical or toroidal surface as well as a second movement of rotation of the twist drill about its geometrical axis in the first case.

This specification also includes description of a machine constructed to permit performing all the types of sharpening operations required for carrying out the method set forth hereinabove.

The advantageous features resulting from this invention will appear more clearly as the following description proceeds with reference to the accompanying drawings, the description making a comparison between the known methods and the method of this invention, and showing a typical example of a machine for carrying out this method. In the drawings:

FIG. 1 is a side elevational view of the tip of a conventional twist drill;

FIG. 2 is a diagram for explaining the manner in which the twist drill of this invention is sharpened;

FIG. 3 is a view of the tip of a twist drill sharpened according to the known method forming superposed tapered annular surface portions;

FIG. 4 is a diagram for explaining the cone-and-sphere sharpening method of this invention;

FIG. 5 is a diagram for explaining the cone-and-tore sharpening method of this invention.

Figure 6:
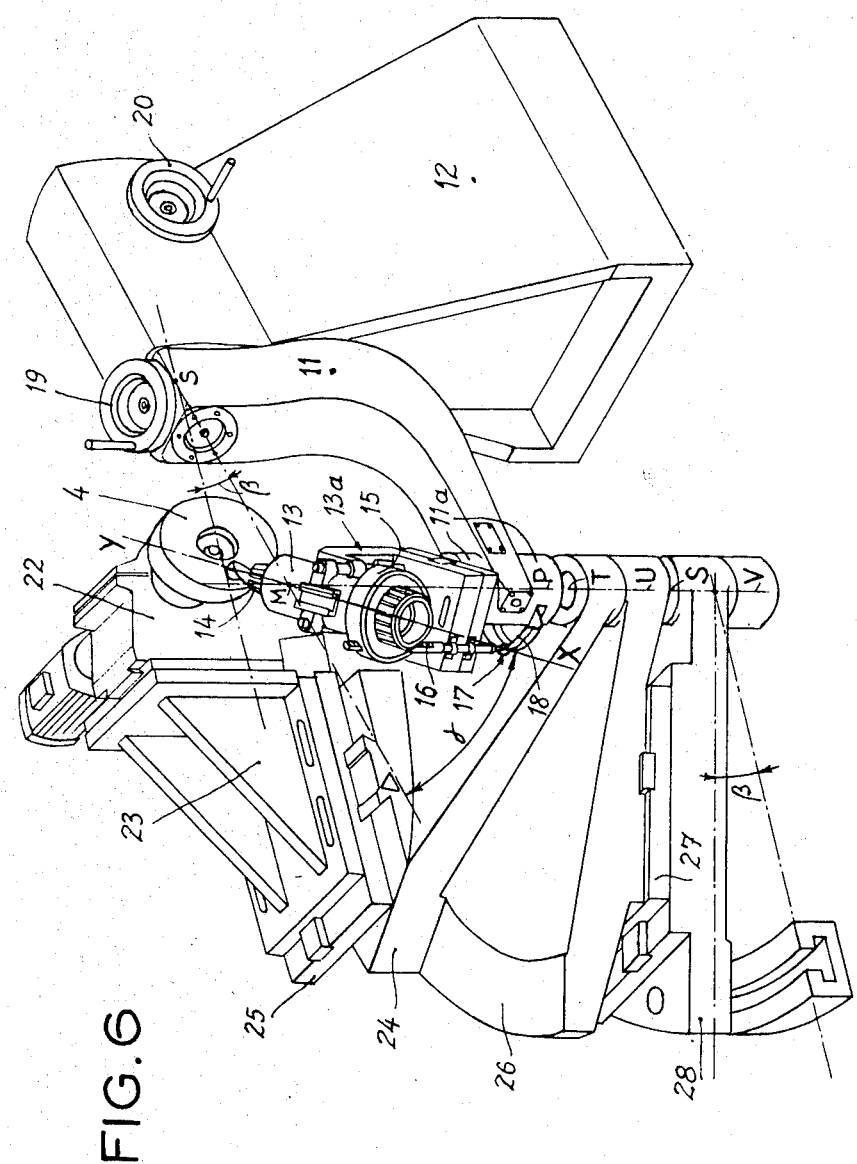
FIG. 6 is a perspective view of a machine for sharpening twist drills according to the method of this invention.

Referring first to FIG. 1, there is shown therein a conventional twist drill of which the point consists of two tapered surfaces such as 1 separated by helical grooves 2, the cutting edges being designated by the reference numeral 3.

A twist drill of this conventional type is usually sharpened as shown in FIG. 2. The apparent vertex angle of the drill being $\phi$, the conical surfaces 1 are obtained as the rake, in relation to the cutting edges 3, by rotating the drill about an axis $\Delta$ inclined by an angle $\beta$ in relation to the plane of the grinding wheel 4, the axis converging to a point S located on this plane.

On the other hand, assuming that said axis $\Delta$ lies in the horizontal plane of the figure, in most cases, the drill axis XY is located in another horizontal plane disposed slightly below the preceding one.

The vertex S of the sharpening cone and the angle $2\beta$ of this cone are generally fixed and characteristic of a sharpening machine.

Experience teaches that this conventional sharpening method is not completely satisfactory.

In fact, the cutting edges 3 wear out rapidly in their outer peripheral portion (as shown by the shaded area 5 of FIGS. 1 and 2) because they operate under detrimental conditions since the cutting speed increases from the center of the drill to the periphery thereof, and also because the actual rake, in contrast thereto, decreases from the center to the periphery.

Under these conditions, the rapid wear of the twist drill in said areas 5 will rapidly affect the quality of the drilling and lead to serious damages in the drill tip, so that the drill must be withdrawn from actual service to avoid its complete destruction.

It is known to endeavour to reduce the consequences of this defect by having each symmetrical surface portion of the drill point made not of a single conical surface but of a plurality of superposed conical or frustoconical surfaces 1, 6 and 7 having decreasing vertex angles $\phi$, $\phi_1$, $\phi_2$ from the point outwards. Now this method is not fully satisfactory for in addition to the considerable time necessary for properly performing the sharpening operation the resulting angles still wear out at an abnormally high rate.

With the method of sharpening twist drills according to this invention the various inconveniences set forth hereinabove are safely avoided by forming notably each one of said symmetrical surface portions of the drill point as a conical surface at the center which merges into a part-spherical or toroidal peripheral surface (FIG. 4) tangent to said conical surface.

In the first case, as shown in FIG. 4, the two symmetric surface portions of the drill tip consist each of a conical portion 8 surrounded by a part-spherical surface portion 9, the relative surface area of these portions being variable to a substantial extent.

The part-spherical portion 9 is centered at M lying on the axis $\Delta$ of the sharpening cone and a radius R such that the sphere centered at M be tangent to the conical portion 8. The point M is projected at $M_1$ on the drill axis XY which, as already explained, is still positioned in a horizontal plane underlying the plane of the figure.

In the second case (see FIG. 5) the conical portion defined hereinabove merges tangentially to a toroidal surface 10 pertaining to a tore having a radius $r$ smaller than R, inscribed in the sharpening cone.

According to this invention a considerably more satisfactory rake can be obtained along the cutting edges in comparison with the conventional method.

In fact, if we consider the conical surface portion 8 we see that the rake is effectively obtained, as in the conventional sharpening method, by rotating the drill about the axis $\Delta$ inclined by the angle $\beta$ in relation to the plane of the grinding wheel 4 and passing through the point S spaced by a distance OS from the drill point, but the fact that the cutting edge corresponding to this conical surface portion does not extend beyond the point A and is therefore shorter than the drill diameter causes the real rake to vary within narrower limits and preserves an acceptable value at A. Moreover, with this method the values of $\beta$ and OS are not fixed and can easily be selected as a function of the characteristics and conditions of use of the twist drill (diameter, vertex angle, material to be drilled, cutting speed, feed, etc.) so that the most satisfactory rake value can be applied.

Reverting now to FIG. 4, and considering the part-spherical portion 9, a satisfactory rake of cutting edges AC and BD is obtained according to the present invention not only by shifting the twist drill vertically and rotating it about the axis $\Delta$ as in the preceding case, but also by simultaneously rotating the drill about the vertical axis $M-M_1$ and its axis XY in order to obtain along the entire cutting edge an optimum real rake, with due consideration for the operating conditions of the twist drill and for its inherent characteristics.

The method of sharpening twist drills having a conical and toroidal point as shown in FIG. 5 is similar to that of the twist drill having a conical and spherical point as shown in FIG. 4, except that it is the grinding wheel that is rotated for generating the elementary toroidal surfaces and that the drill is not rotated about its axis.

The machine illustrated in FIG. 6 permits making all the sharpening operations necessary for carrying out the above disclosed and defined method.

This machine comprises a bent arm 11 mounted for rotation on a supporting frame 12 about an axis corresponding to the aforesaid axis $\Delta$, and adapted to rotate through a certain angle about this axis. The arm 11 carries through the medium of a member 11a rigid therewith a drill holder 13 of which the axis XY, in its initial vertical position, intersects the axis $\Delta$ at the point M and forms therewith the angle $\gamma$ indicated on FIGS. 4 and 5. The drill holder 13 comprises a support 13a rotatably mounted on member 11a about a vertical axis shown geometrically at MP which is perpendicular at M to the horizontal plane containing the axes $\Delta$ and XY. Said drill holder comprises an inner jaw chuck 14 in which the twist drill can be locked in a predetermined initial position.

The chuck proper is adapted to be rotatably driven from a toothed wheel rigid therewith, disposed in a case 15 and meshing with a rack 16 slidably mounted on the drill holder, the movements of this rack being controlled through a roller 17 rigid with said rack and a cam 18 mounted on the member 11a of arm 11; in other words, when the drill holder 13 is rotated about the axis MP the twist drill is rotated simultaneously about its axis XY. The rotation of the drill holder 13 about the axis MP is controlled in this case through a transmission (not shown) connecting same within the arm 11 to a handwheel 19 mounted thereon in the vicinity of the pivot corresponding to the axis $\Delta$. The rotation of arm 11 about this axis is controlled by means of a handwheel 20 mounted on the frame 12.

This machine further comprises a grinding wheel 4 rotatably mounted on a bearing block 22 slidably mounted in turn on and vertically adjustable in relation to, a bracket 23 adapted to slide horizontally in two directions at right angles to each other in relation to a support 24, due to the interposition of a plate 25 on which said bracket is adapted to slide in one of these two directions, this plate 25 being adapted in turn to slide on the support 24 in the other direction perpendicular to the preceding one.

The support 24 is pivoted on a sector 26 about an axis TU initially in alignment with axis MP and adapted to be shifted so as to remain parallel thereto by a sliding mounting of sector 26, in two perpendicular directions obtained respectively between the sector 26 and a plate 27, and between this plate 27 and a base plate 28. This base plate 28 is pivoted in turn about an axis SV also in alignment with the uppermost axis MP.

The drill holder 13 is adjustable in the vertical direction by means of its support 13a in order to provide the shift $MM_1$ mentioned hereinabove.

Thus, with this machine, the part-spherical portion of the drill tip is sharpened by keeping the axis TU in alignment with the vertical axis MP, the toroidal surface portion being sharpened by shifting these axes, that is, members 26 and 28, in relation to each other. In this last case, it is the grinding wheel that will be gradually turned about the axis TU to generate the elementary toroidal surfaces. A driving mechanism (not shown) of any suitable and known type is interposed to this end between the members 24 and 26.

It may be added that the machine described hereinabove further permits, in addition to the sharpening of twist drills, for which it was specially designed, other special sharpening works, and notably of obtaining the perfect joining of the lateral surfaces of a cutting tool (for lathe, plaining-machine, etc.) by means of conical surfaces, whatever the necessary rakes may be.

What is claimed is:

1. A method of sharpening twist drills, for forming each one of the symmetrical surface portions of the drill point as a conical central surface edged with a part-spherical surface portion tangent to said conical central surface, comprising the steps of sharpening said conical portion against the plane of the grinding wheel by rotating the drill about an axis which is oblique to the plane of the grinding wheel and to the axis of the drill longitudinal axis, and sharpening said part-spherical surface portion by adding to the preceding movement of rotation a first relative rotation between said grinding wheel and said drill about the axis of revolution corresponding to said part-spherical surface portion.

2. The method according to claim 1 further comprising imparting a second simultaneous rotation of the drill about its longitudinal axis as a function of said first relative rotation.

3. A method of sharpening twist drills for forming each one of the symmetrical surface portions of the drill point as a conical central surface edged with a toroidal surface portion tangent to said conical central surface, comprising the steps of sharpening said conical portion against the plane of the grinding wheel by rotating the drill about an axis which is oblique to the plane of the grinding wheel and to the axis of the drill longitudinal axis, and sharpening said toroidal surface portion by adding to the preceding movement of rotation a first relative rotation between said grinding wheel and said drill about the axis of revolution corresponding to said toroidal surface portion.

References Cited

UNITED STATES PATENTS

| | | | |
|---|---|---|---|
| 2,866,302 | 12/1958 | Amiet | 51—219 |
| 2,972,839 | 2/1961 | Erdelyi | 51—288 |

FOREIGN PATENTS 575,529 2/1946 Great Britain.

HAROLD D. WHITEHEAD, Primary Examiner